(12) United States Patent
Stevenson et al.

(10) Patent No.: US 7,294,684 B2
(45) Date of Patent: Nov. 13, 2007

(54) DIMERIC AND POLYMERIC ALKYLPHENOL POLYSULFIDES

(75) Inventors: Donald R. Stevenson, Dover, OH (US); Satyan Kodali, Starkville, MS (US); Duong N. Nguyen, Dover, OH (US)

(73) Assignee: Dover Chemical Corporation, Dover, OH (US)

(*) Notice: Subject to any disclaimer, the term of this patent is extended or adjusted under 35 U.S.C. 154(b) by 0 days.

(21) Appl. No.: 11/558,902

(22) Filed: Nov. 11, 2006

(65) Prior Publication Data

US 2007/0093613 A1 Apr. 26, 2007

Related U.S. Application Data

(60) Provisional application No. 60/597,124, filed on Nov. 11, 2005.

(51) Int. Cl.
*C08G 75/14* (2006.01)

(52) U.S. Cl. .............. 528/381; 528/373; 528/389

(58) Field of Classification Search ............. 528/381, 528/373, 389
See application file for complete search history.

(56) References Cited

U.S. PATENT DOCUMENTS

| | | | |
|---|---|---|---|
| 2,422,156 A * | 6/1947 | Wolf et al. ............ | 525/150 |
| 3,671,503 A | 6/1972 | Schubert et al. | |
| 3,812,192 A | 5/1974 | Gabler et al. | |
| 3,882,082 A * | 5/1975 | Robin et al. ............ | 524/331 |
| 4,022,828 A | 5/1977 | Arnold et al. | |
| 4,102,862 A | 7/1978 | Monte et al. | |
| 4,324,870 A | 4/1982 | Rim et al. | |
| 5,177,133 A * | 1/1993 | Peck et al. ............ | 524/139 |
| 5,684,091 A | 11/1997 | Maly et al. | |
| 6,303,746 B1 | 10/2001 | Goswami et al. | |
| 6,312,774 B1 * | 11/2001 | Goswami et al. ............ | 428/17 |
| 6,383,552 B1 | 5/2002 | Noecker et al. | |

FOREIGN PATENT DOCUMENTS

EP 0 234 923 A2 * 9/1987

OTHER PUBLICATIONS

VULTAC® 710 (Amylphenol Disulfide).
VULTAC® 5 (Amylphenol Disulfide).

* cited by examiner

*Primary Examiner*—Ling-Sui Choi
(74) *Attorney, Agent, or Firm*—Buckingham Doolittle & Burroughs, LLP; Louis F. Wagner

(57) ABSTRACT

The invention relates to a process and composition-of-matter for the preparation of dimeric and polymeric alkylphenol polysulfides based on paracumyl phenol for use in vulcanizable rubbers in which the additive is a dimeric or polymeric alkylphenol polysulfide non-nitrosamine-releasing additive based on paracumyl phenol.

17 Claims, No Drawings

DIMERIC AND POLYMERIC ALKYLPHENOL POLYSULFIDES

TECHNICAL FIELD

This invention relates generally to a process and composition-of-matter for the preparation of dimeric and polymeric alkylphenol polysulfides based on p-cumylphenol.

BACKGROUND OF THE INVENTION

For the process of vulcanization to be useful and successful, it should be controlled. It should begin when required, accelerate when needed and must stop at the right time. In the jargon of rubber technologists, these are termed as scorch resistance, acceleration and cure time, respectively. Scorch resistance is the time elapsed before vulcanization starts. It is necessary to have suitable scorch resistance so that there is enough time for mixing, storing and molding of the rubber mixture into the desired shape and size. Premature vulcanization results in the development of cracks in rubber, making the resulting products unusable. Once vulcanization begins, it should be completed as fast as possible in order to have practical batch cycle. Shorter cure times are preferred. Thus, it is important to control the way molecules interact with each other at different stages in order to achieve the desired physical property.

In order to achieve the above objective in the production and processing of rubber mixtures which contain vulcanizing agents, e.g., sulfur and accelerators, a certain amount of premature vulcanization, known as scorching, may occur before the proper vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time. This scorching may occur, for example, in the mixer or during any of the subsequent processes such as extruding or calendaring. It is known that the risk of scorching can be reduced by the addition of a N-nitrosoamine, especially, N-nitroso-diphenylamine, to the rubber mixture. In certain circumstances, however, the use of these retardants leads to the formation of porous vulcanizates due to the nitroso group being split off. Further, these compounds not only influence the scorching but also have a marked effect on the entire vulcanization process, i.e., the vulcanization time is increased. Furthermore, a rather large dose of an N-nitrosoamine is required for achieving a given retarding effect.

It is recognized that many properties of a final rubber vulcanizate are important including stress strain properties and rheometer values. Other factors relating to the vulcanization which are of importance are the rate of cure, the cure time, the scorch behavior and the extent of cure. These physical properties can be altered either beneficially or detrimentally through the inclusion of chemical or components that impact upon the rate and state of vulcanization. Many accelerator combinations have been used in the rubber industry. Unfortunately, many of the known accelerators, such as morpholine containing accelerators, and dimethylamine containing accelerators yield volatile nitrosamines upon use. The use of accelerators which yield volatile nitrosamines have been significantly restricted in a number of countries, and the need to find a suitable replacement is ongoing.

U.S. Pat. No. 2,422,156 describes the process of reacting sulfur monochloride with tertiary alkylphenols to form tertiary alkylphenol sulfides for use in the vulcanization of rubber-like butadiene-1,3 polymerizates. Alkylphenol disulfides, specifically tertiary-amylphenol di- and poly-sulfides as well as tertiary-butylphenol di- and poly-sulfides have been available and used for many years as vulcanizing agents for rubber products. Typically the alkylphenol di- and poly-sulfides improve aging properties of the rubber as illustrated as formula (V) below.

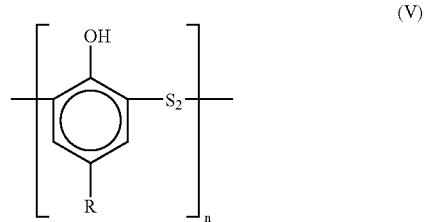

(V)

wherein

R is an alkyl radical selected from the group consisting of primary, secondary and tertiary radicals; and n is an integral value dependent upon the reactants used.

U.S. Pat. No. 3,812,192 also gives a process for the manufacture of polythiobisphenol. The process for making the p-cumylphenol disulfides involves the reaction of sulfur monochloride with the alkyl or alkylarylphenol with or without a solvent. Typical solvents are toluene, xylene, octane or other like solvents. The disulfides are illustrated below as formulas (VI) and (VII).

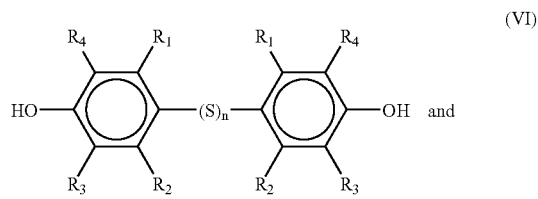

(VI)

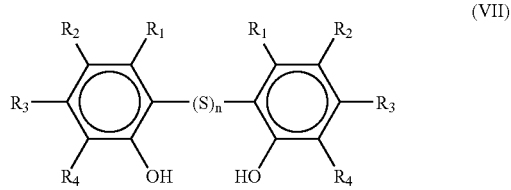

(VII)

wherein $R_{1-4}$ are independently H, $C_{1-4}$ alkyl, and halogen (preferably chlorine); and n is an integral value from 2 to 3.

U.S. Pat. No. 6,303,746B1 gives a process for making polymeric alkyl phenol sulfides that are useful as wood preservatives, the composition of which is illustrated below as formula (IV)

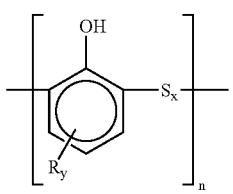

wherein
R is a lower alkyl containing from 1-4 carbons;
n is an integral value from 1 to 10; and
x is an integral value from 1 to 4; and
y is an integral value from 1 to 3.

Unlike the prior art, this invention involves alkyl-aryl phenol di- and polysulfides that show excellent cure times, scorch times, and heat aging properties are based on p-cumyl phenol and substituted derivatives thereof.

SUMMARY OF THE INVENTION

Accordingly it is a principal object of the invention to provide an alternative to existing di- and poly-sulfides which show at least similar, if not superior properties when blended without the negative effect of releasing nitrosamines.

These and other objects of the present invention will become more readily apparent from a reading of the following detailed description taken in conjunction with reference to the appended claims.

DETAILED DESCRIPTION OF THE INVENTION

The dimeric and polymeric alkylaryl phenolic sulfides, particularly p-cumylphenol sulfides, optionally where the p-cumylphenol group is substituted, are a class of chemical compounds which can be represented by the following formula (I).

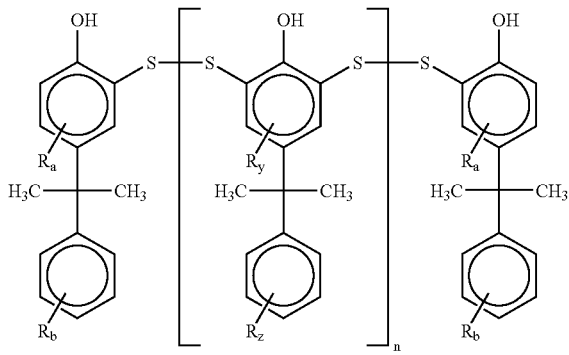

wherein
R is a independently selected from the group consisting of H, $C_{1-9}$ alkyls, $C_{1-9}$ aryls, $C_{1-14}$ alkylaryls, $C_{1-14}$ arylalkyls, and halogens;
n is an integral value from 0 to 10 inclusive;
a is an integral value from 0 to 3 inclusive;
b is an integral value from 0 to 5 inclusive; and
y is an integral value from 0 to 2 inclusive;
z is an integral value from 0 to 5 inclusive.

The advantages and important features of the present invention will be more apparent from the following examples

EXAMPLE #1

Table I gives the typical preparation of bis-p-cumylphenol disulfide of formula (II) using toluene or xylene as the solvent

TABLE I

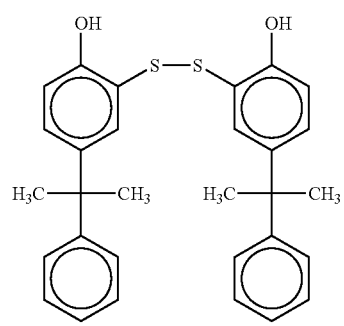

| Starting Materials | M.W. | Moles | Wt. (g) | Wt. % | % S |
|---|---|---|---|---|---|
| p-cumylphenol | 212 | 0.33 | 71 | 61.2 | — |
| $S_2Cl_2$ (sulfur monochloride) | 135 | 0.33 | 45 | 38.8 | 47.4 |

The following steps were employed. A clean and dry 3-neck flask was equipped with a graduated dropping funnel and a Dean-Stark head. P-cumylphenol was charged as a liquid or solid into the flask, followed by toluene or xylene as the solvent and the mixture agitated. Sulfur monochloride was charged into the dropping funnel with a transfer needle-line under nitrogen followed by dropwise addition of $S_2C_2$. During the exothermic addition, the reaction temperature increased to 25° C. from 20° C. when the addition was complete. Further heating raised the reaction temperature to 86° C. This temperature, between (80° C.-86° C.) was maintained for about 2 hours. The reaction was allowed to start to cool under a nitrogen blanket with transfer onto aluminum foil for drying while the temperature of the product was still >50° C. Residual toluene or xylene was removed in a heated vacuum oven to afford a yellow crystalline material.

The preparation can be modified to also produce not only the disulfide but some polysulfide. This is done by adding elemental sulfur during the reaction of the p-cumyl phenol with the sulfur monochloride. The final product can further be modified by adding stearic acid to the di- or polysulfide while the product is still molten.

Such modifications are typical. For example Vultac™ 7 (Atofina) is a disulfide of para-t-amylphenol and Vultac™ 710 is Vultac™ 7 with 10% stearic acid. The properties of some of these prior art and experimental di- or polysulfides are given in Table II.

TABLE II

| Product | Chemical Composition | % Sulfur | Softening Point (° C.) | Observations |
|---|---|---|---|---|
| Vultac ™ 7 | (tert-amyl phenol polysulfide structure) | 30 | 110 | Dark brown tacky flakes |
| Vultac ™ 710 | (tert-amyl phenol polysulfide structure) + 10% CH$_3$(CH$_2$)$_{16}$COOH | 27 | 80 | Containing 10% stearic acid, brown tacky flakes |
| Formula (II) | (cumyl phenol disulfide structure) | 22-23 | 92 | Reddish and brittle |
| Formula (III) | (cumyl phenol polysulfide structure) + 10% CH$_3$(CH$_2$)$_{16}$COOH + 5.8% S | 26-27 | 63 | 5.8% elemental sulfur added during reaction + 10% stearic acid at the end |

Alkylphenol disulfides are of interest because they are one of the few "non-nitrosamine" sulfur donors and they are much less expensive than other "non-nitrosoamine" sulfur donors such as tetrabenzyl thiuram disulphide (TBzTD) and dithiodicaprolactam (DTDC).

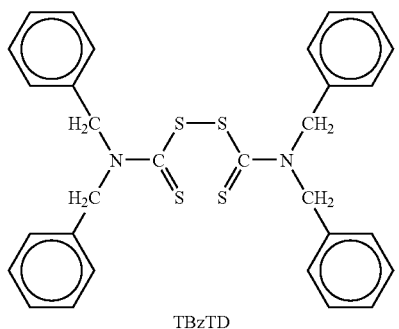

TBzTD

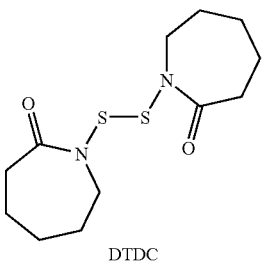

DTDC

The alkyl-arylphenol disulfides based on para-cumylphenol have all the benefits of the alkylphenol disulfides but also have other benefits such as: lower tack (to make it easier to store and handle); lower volatility; lower volatile degradation products; good compatibility with many rubber polymers; and very good antioxidant properties. The other advantages of alkylphenol and the alkyl-arylphenol disulfides include: improved heat age properties of vulcanizates because of their generation of mono- and di-sulfidic crosslinks; ability to act as a resinous plasticizer during processing; ability to increase the green tack in NBR, BR and SBR based compounds; ability to improve the dispersion of other compound ingredients into the rubber; and the fact that they do not contain any nitrogen or amines which must be present for nitrosamine formation

EXAMPLE #2

A comparative study in EPDM (ethylene propylene diene monomer) is illustrated in Table III. EPDM was compounded with carbon black and oil. The cure system employed thiozole sulfenamide, sulfur and either alkyphenol or alkylaryl phenol disulfide polymer. The alkylphenol disulfide or the alkylaryl phenol disulfide were used at 2 phr (parts per hundred parts rubber) for those compounds which contained stearic acid and at 1.88 phr for those without stearic acid with results as shown in Table III

TABLE III

| Rheometer 350° F. | Vultac ™ 710 | Formula (II) | Formula (III) |
|---|---|---|---|
| Max. torque | 10.95 | 9.71 | 11.22 |
| Tc(10) (min.)[a] | 0.84 | 0.79 | 0.86 |
| Tc(50) (min.)[b] | 1.6 | 1.5 | 1.6 |

TABLE III-continued

| Rheometer 350° F. | Vultac ™ 710 | Formula (II) | Formula (III) |
|---|---|---|---|
| Scorch time - Ts2 (min.) | 1.03 | 1.03 | 1.07 |

[a] = time to 10% torque increase
[b] = time to 50% torque increase

EXAMPLE #3

A comparative study was performed in Styrene Butadiene Rubber (SBR). A masterbatch was prepared containing 100 phr rubber/62.5 phr aromatic oil and 82.5 phr N339 carbon black as shown in Table IV with results in Table V.

TABLE IV

| Formula | phr |
|---|---|
| SBR 1848 | 245.00 |
| Stearic acid | 2.00 |
| Zinc oxide | 3.00 |
| Sulfur | 1.50 |
| TBBS accelerator (N-Tertiarybutyl-2-benzothiazole sulfonamide) | 1.50 |
| Alkyl or alkylarylphenol disulfide polymer | 2.00 (stearic acid) or 1.88 (no stearic acid |

TABLE V

| Rheometer 350° F. | Vultac 710 | Formula II | Formula III |
|---|---|---|---|
| Max. torque/in.-lb. | 9.23 | 8.38 | 9.32 |
| Tc(10) (min.)[a] | 1.34 | 1.47 | 1.27 |
| Tc(50) (min.)[b] | 2.2 | 2.44 | 2.13 |
| Scorch time - Ts2 (min.) | 1.68 | 1.94 | 1.6 |

[a] = time to 10% torque increase
[b] = time to 50% torque increase

The data above shows that Formula II matches or exceeds the performance of Vultac™ 710.

Para-cumylphenol can be used to produce alkylarylphenol disulfide polymers having good properties in regard to curing rubber compounds and they are less volatile and have excellent compatibility with several rubber materials. The base para-cumylphenol disulfide polymer can be modified by adding elemental sulfur during the preparation (this gives a final product with a higher sulfur content) or by adding stearic acid to lower the softening point.

Therefore, what has been shown can generally be described as a process for at least maintaining or more preferably, improving physical properties of a vulcanizable rubber by the incorporation of a non-nitrosamine-releasing compound comprising a di- and polysulfide having a composition illustrated by formula (I)

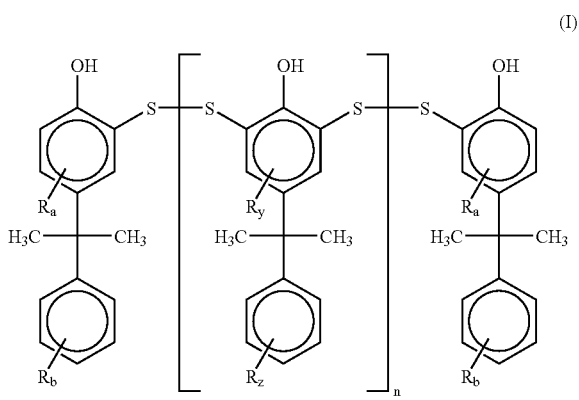

wherein
R is a independently selected from the group consisting of H, $C_{1-9}$ alkyls, $C_{1-9}$ aryls, $C_{1-14}$ alkylaryls, $C_{1-14}$ arylalkyls, and halogens;
n is an integral value from 0 to 10;
a is an integral value from 0 to 3 inclusive;
b is an integral value from 0 to 5 inclusive;
y is an integral value from 0 to 2; and
z is an integral value from 0 to 5.

In general, the amount of non-nitrosamine releasing compound which is added to the rubber is between 0.5 to 20 phr inclusive, more preferably 1 to 10 phr inclusive, and most preferably, 2 phr.

In a preferred embodiment, n in formula (I) is zero and the non-nitrosamine releasing compound is of formula (II)

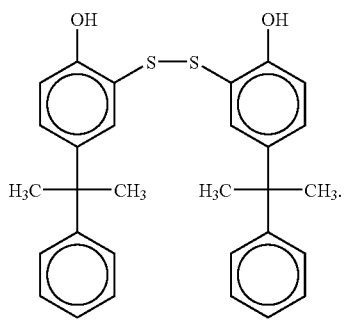

The dimeric and polymeric alkylphenol polysulfides which are based on p-cumylphenol are synthesized in general by the following steps:
(a) adding p-cumylphenol to a solvent;
(b) adding sulfur monochloride to the solvent;
(c) heating the paracumylphenol and sulfurmonochloride and solvent; and
(d) removing at least some of the solvent.

In one embodiment, the above process further includes the step of adding elemental sulfur during the reaction of p-cumylphenol and sulfur monochloride. Also optionally, the process further includes the step of adding stearic acid. The solvent is typically chosen from the group of toluene, xylene and benzene, more preferably toluene and xylene.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

This invention has been described in detail with reference to specific embodiments thereof, including the respective best modes for carrying out each embodiment. It shall be understood that these illustrations are by way of example and not by way of limitation.

What is claimed is:

1. A process for maintaining or improving physical properties of a vulcanizable rubber by the incorporation of a non-nitrosamine-releasing compound comprising a di- and poly- sulfide having a composition illustrated by formula (I)

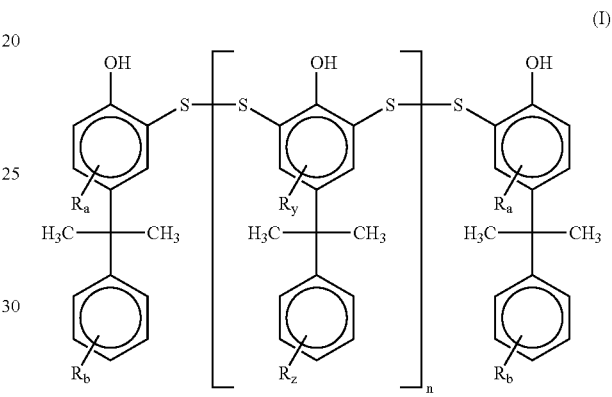

wherein
R is a independently selected from the group consisting of H, $C_{1-9}$ alkyls, $C_{1-9}$ aryls, $C_{1-14}$ alkylaryls, $C_{1-14}$ arylalkyls, and halogens,
n is an integral value from 0 to 10;
a is an integral value from 0 to 3 inclusive;
b is an integral value from 0 to 5 inclusive;
y is an integral value from 0 to 2; and
z is an integral value from 0 to 5.

2. The process of claim 1 wherein said non-nitrosamine releasing compound is added at 0.5 to 20 phr inclusive.

3. The process of claim 2 wherein said non-nitrosamine releasing compound is added at 1 to 10 phr inclusive.

4. The process of claim 3 wherein said non-nitrosamine releasing compound is added at 2 phr.

5. The process of claim 1 wherein said maintaining or improving in physical properties of said rubber is selected from the group consisting of reduction in premature vulcanization, lower tack, lower volatility, lower volatile degradation, improved heat aging properties, increase in green tack, improved additive dispersability over said rubber which does not include said non-nitrosamine-releasing compound.

6. The process of claim 5 wherein said maintaining or improving in physical properties is a reduction in premature vulcanization or scorching.

7. A process for synthesizing alkylarylphenol polysulfides comprising the steps of:
(a) adding p-cumylphenol to a solvent;
(b) adding sulfur monochloride to said solvent;
(c) heating said p-cumylphenol and sulfur monochloride and solvent; and
(d) removing at least some of said solvent.

8. The process of claim 7 which further comprises the step of adding elemental sulfur during said reaction of p-cumylphenol and sulfur monochloride.

9. The process of claim 8 which further comprises the step of adding stearic acid.

10. The process of claim 7 wherein said solvent is selected from the group consisting of toluene, xylene and benzene.

11. The process of claim 7 wherein said solvent is selected from the group consisting of toluene and xylene.

12. A process for maintaining or improving physical properties of a vulcanizable rubber by the incorporation of a non-nitrosamine-releasing compound comprising a disulfide having a composition illustrated by formula (II)

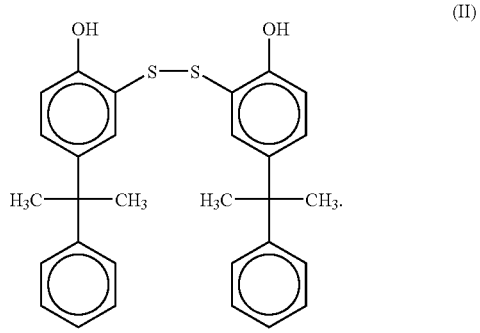

(II)

13. The process of claim 12 wherein said non-nitrosamine releasing compound is added at 05 to 20 phr inclusive.

14. The process of claim 13 wherein said non-nitrosamine releasing compound is added at 1 to 10 phr inclusive.

15. The process of claim 14 wherein said non-nitrosamine releasing compound is added at 2 phr.

16. The process of claim 12 wherein said maintaining or improving in physical properties of said rubber is selected from the group consisting of reduction in premature vulcanization, lower tack, lower volatility, lower volatile degradation, improved heat aging properties, increase in green tack, improved additive dispersability over said rubber which does not include said non-nitrosamine-releasing compound.

17. The process of claim 16 wherein said maintaining or improving in physical properties is a reduction in premature vulcanization or scorching.

* * * * *

UNITED STATES PATENT AND TRADEMARK OFFICE
CERTIFICATE OF CORRECTION

| | |
|---|---|
| PATENT NO. | : 7,294,684 B2 |
| APPLICATION NO. | : 11/558902 |
| DATED | : November 13, 2007 |
| INVENTOR(S) | : Donald R. Stevenson, Satyan Kodali and Duong N. Nguyen |

It is certified that error appears in the above-identified patent and that said Letters Patent is hereby corrected as shown below:

In column 4, line 44, please amend "$S_2C_2$" to -- $S_2Cl_2$ --.

In claim 13, line 2, please amend "05" to -- 0.5 --.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,294,684 B2
APPLICATION NO. : 11/558902
DATED : November 13, 2007
INVENTOR(S) : Donald R. Stevenson, Satyan Kodali and Duong N. Nguyen Page 1 of 1

It is certified that error appears in the above-identified patent and that said Letters Patent is hereby corrected as shown below:

In column 4, line 44, please amend "$S_2C_2$" to -- $S_2Cl_2$ --.

Column 12 (claim 13) line 2, please amend "05" to -- 0.5 --.

This certificate supersedes the Certificate of Correction issued March 18, 2008.

Signed and Sealed this

Fifteenth Day of April, 2008

JON W. DUDAS
*Director of the United States Patent and Trademark Office*